(12) United States Patent
Martinez

(10) Patent No.: US 7,992,107 B2
(45) Date of Patent: *Aug. 2, 2011

(54) SPOTLIGHT CURSOR

(75) Inventor: Anthony Edward Martinez, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 307 days.

This patent is subject to a terminal disclaimer.

(21) Appl. No.: 12/400,108

(22) Filed: Mar. 9, 2009

(65) Prior Publication Data

US 2009/0164950 A1    Jun. 25, 2009

Related U.S. Application Data

(63) Continuation of application No. 09/657,116, filed on Sep. 7, 2000, now Pat. No. 7,509,592.

(51) Int. Cl.
*G06F 3/048* (2006.01)
(52) U.S. Cl. ...................................... 715/862
(58) Field of Classification Search .................. 715/856, 715/857, 859, 860, 861, 862
See application file for complete search history.

(56) References Cited

U.S. PATENT DOCUMENTS

| | | | |
|---|---|---|---|
| 5,488,685 | A | 1/1996 | Palmer et al. |
| 5,526,478 | A | 6/1996 | Russell, Jr. et al. |
| 5,748,927 | A | 5/1998 | Stein et al. |
| 5,861,885 | A | 1/1999 | Strasnick et al. |
| 5,995,101 | A | 11/1999 | Clark et al. |
| 6,018,345 | A | 1/2000 | Berstis |
| 6,046,722 | A | 4/2000 | McKiel, Jr. |
| 6,075,531 | A | 6/2000 | DeStefano |
| 6,091,395 | A | 7/2000 | DeStefano |
| 6,392,671 | B1 | 5/2002 | Glaser |
| 6,559,872 | B1 | 5/2003 | Lehikoinen et al. |

FOREIGN PATENT DOCUMENTS

| | | |
|---|---|---|
| JP | 06004607 | 1/1994 |
| JP | 8115194 | 5/1996 |
| JP | 10105357 | 4/1998 |
| JP | 10255067 | 9/1998 |
| JP | 63256987 | 10/1998 |
| JP | 11110098 | 4/1999 |
| JP | 11306375 | 11/1999 |
| JP | 2000222086 | 8/2000 |

*Primary Examiner* — Thanh T Vu
(74) *Attorney, Agent, or Firm* — Yee & Associates, P.C.; Mark C. Vallone; Rudolf O. Siegesmund

(57) ABSTRACT

An apparatus and method is disclosed for displaying a secondary layer of information in a graphical user interface where the second layer of information is revealed when a point on the circumference defined by radius "r" originating at the x,y coordinates of the cursor covers a point in a secondary content of the second layer. The circumference may be set to trigger appearance of secondary content gradually, all at once or to trigger the appearance of all secondary content in a predefined zone.

4 Claims, 6 Drawing Sheets

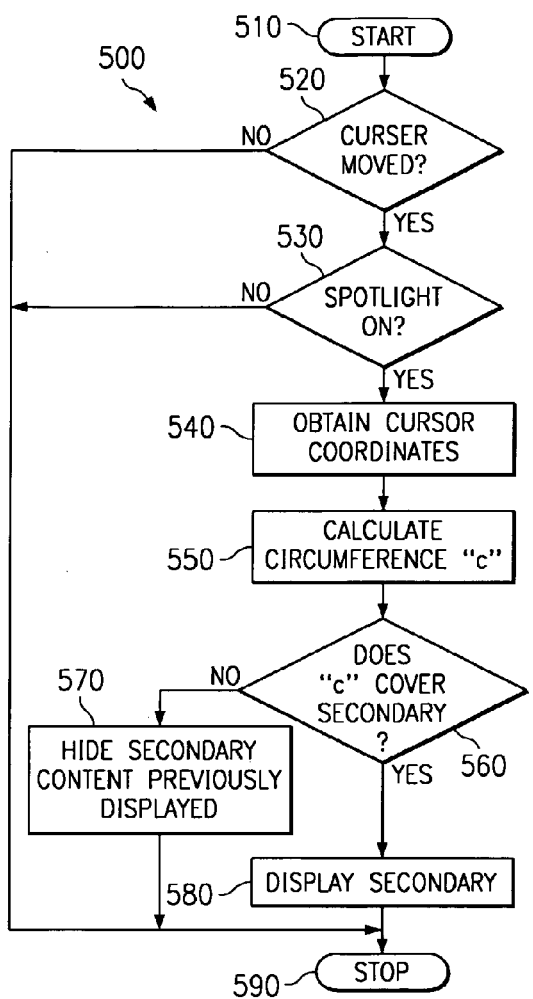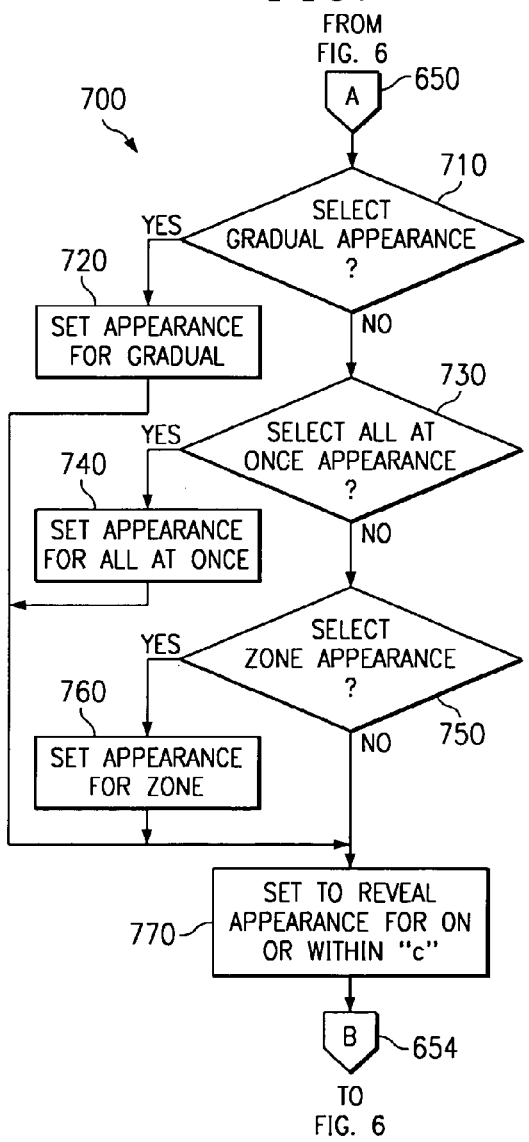

SPOTLIGHT CURSOR

This application is a continuation of application Ser. No. 09/657,116, filed Sep. 07, 2000, status allowed.

FIELD OF THE INVENTION

The present invention relates to an apparatus and method for eliminating clutter in a graphical user interface by revealing secondary content in response to movement of the cursor.

BACKGROUND OF THE INVENTION

In complex graphical user interface design, a challenge exists to strike a proper balance between functionality and screen clutter that impedes ease of use. Controls and annotation essential for the user to accomplish a task are primary content. Graphical User Interfaces (GUI's) often contain controls and annotations not critical for task completion. These controls and annotations are typically designed to supplement and explain the operation of the interface. Such controls and annotations are designated as secondary content. Examples of secondary content are items for context help popups, textual explanations and other non-critical functions. Although intended to enhance ease of use, secondary content often clutters the screen creating more visual "noise" that must be read and prioritized by the user in order for the user to progress through the task.

A need exists for a way to make secondary content "invisible" and to reveal the secondary content only when it might be needed and where the user is placed in control of the breadth of the exposure of the secondary content. Therefore a further need exists for a way to reveal items of secondary content based on actions taken by the user such as movement of the cursor.

U.S. Pat. No. 6,018,345 discloses movement and presentation of the cursor used to indicate the presence of links and means of traversing the links. The cursor is presented in a first manner while the cursor is over non-link elements in the first page. As the cursor is moved over the links, the cursor is presented in a second manner indicating to the user how to traverse to the second page. U.S. Pat. No. 5,526,478 discloses a computer implemented method of annotating a geometric figure displayed and manipulable in three-dimensional representation on a display of a computer system with a pointer. The pointer is also displayed and manipulable in three dimensional representation on the display. The particular view orientation of the geometric figure with the pointer can be preserved such that the particular view orientation of the geometric figure with the pointer can later be retrieved. When the pointer is activated, the pointer can be associated with a multimedia function such that when the pointer is again activated, the multi-media function is executed. U.S. Pat. No. 5,488,685 discloses an object oriented graphic user interface (GUI) having overlapping windows and an access window having topics, index and "look for" button functions for selection by a user. Selection of one of the button functions results in the generation and display of entries in a predefined area of the access window. Visual cues in the form of coach marks are generated for identifying features on the display. The coach marks encircle, point to, and/or underline objects, features, icons, folders and other display elements to assist the user in operating the computer.

What is needed beyond the prior art is a simple and effective way to cause secondary content to be revealed based on user actions.

SUMMARY OF THE INVENTION

The invention which meets the needs identified above is an apparatus and method for displaying a secondary layer of information in a graphical user interface where the second layer of information is revealed when a point on the circumference defined by radius "r" originating at the x,y coordinates of the cursor covers a point in a secondary content of the second layer. The circumference may be set to trigger appearance of secondary content gradually, all at once or to trigger the appearance of all secondary content in a predefined zone.

BRIEF DESCRIPTION OF THE DRAWINGS

FIG. 5 depicts a flow chart for a first program controlling the spotlight cursor;

FIG. 7 depicts a continuation of the flow chart in FIG. 6;

DETAILED DESCRIPTION OF THE PREFERRED EMBODIMENT

Figure 1:
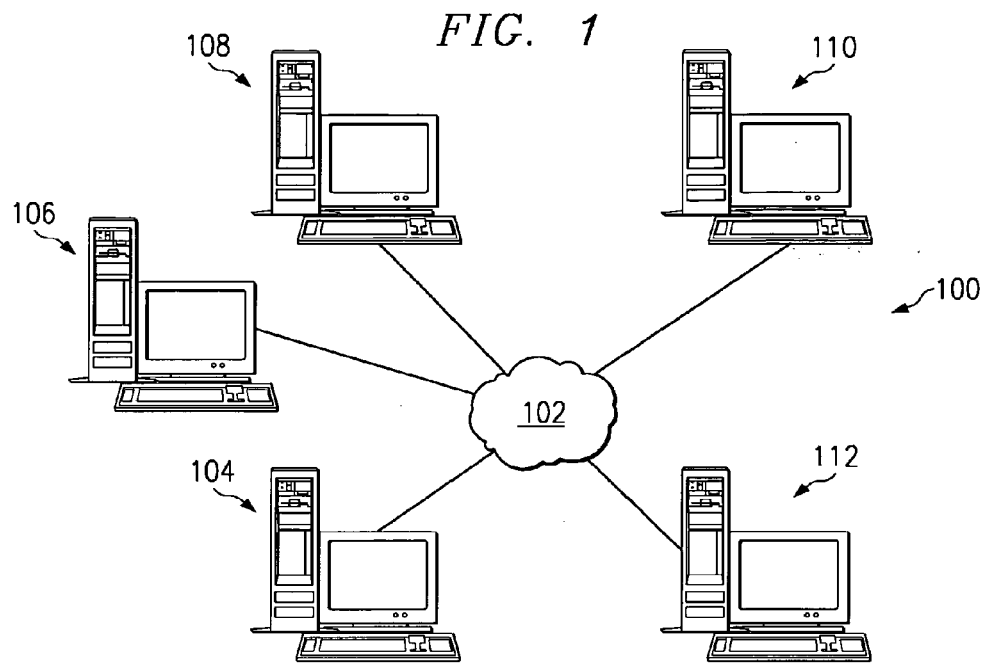
FIG. 1 depicts a distributed data processing system in which the invention may be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. personal computers or network computers. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
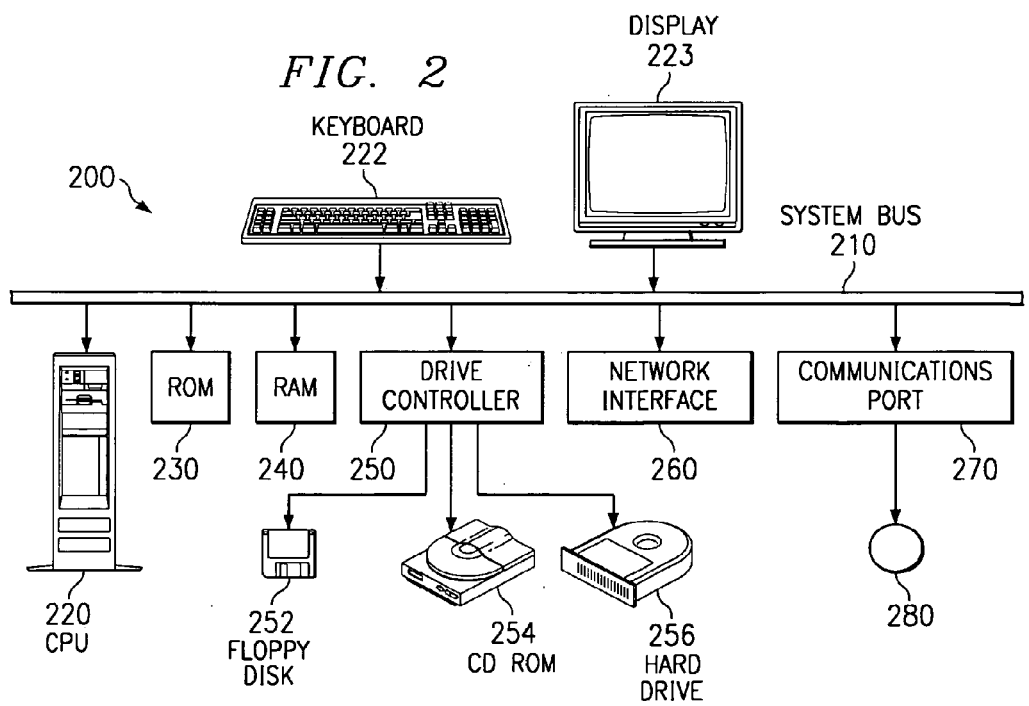
FIG. 2 depicts a computer in which the software to implement the invention may be stored.

FIG. 2 depicts computer 200. Although the depicted embodiment involves a personal computer, a preferred embodiment of the present invention may be implemented in other types of data processing systems. An exemplary hardware arrangement for computer 200 follows. Keyboard 222 and display 223 are connected to system bus 210. Read only memory (ROM) 230 contains, typically, boot strap routines and a Basic Input/Output System (BIOS) utilized to initialize Central Processing Unit (CPU) 220 at start up. Random Access Memory (RAM) 240 represents the main memory utilized for processing data. Drive controller 250 interfaces one or more disk type drives such as floppy disk drive 252, CD ROM 254 and hard disk drive 256. The number and type of drives utilized with a particular system will vary depending upon user requirements. A network interface 260 permits communications to be sent and received from a network. Communications port 270 may be utilized for a dial up connection to one or more networks while network interface 260 is a dedicated interface to a particular network. Programs for controlling the apparatus shown in FIG. 2 are typically stored on a disk drive and then loaded into RAM for execution during the start-up of the computer.

Figure 3:
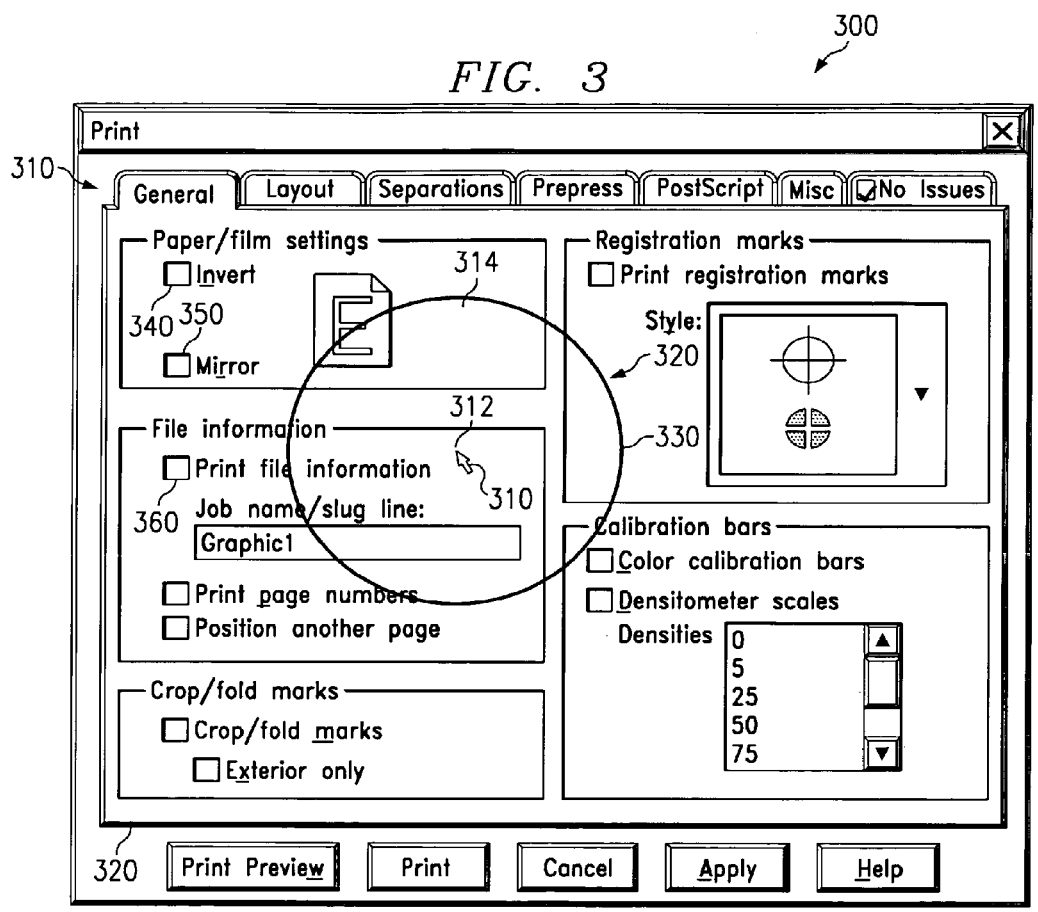
FIG. 3 depicts the spotlight cursor without displayed secondary content.

FIG. 3 depicts the appearance of spotlight cursor 320. Spotlight cursor 320 has light 314, cursor 310 and "c" 330. Cursor 310 has tip 312. When referring to the coordinates of the cursor, the coordinates are those of tip 312. The tip is defined as the most forward point of the arrow displayed as the cursor. Persons skilled in the art are aware that any other point on the cursor could be chosen. Tip 312 defines the center of light 314. Light 314 is an area defined by a circle with circumference "c" 330. Light 314 has radius "r" (not shown) which is the straight line distance from tip 312 to "c" 330. Circumference "c" may appear as a sharp line in contrast to screen 310, a broken line in contrast to screen 310, a soft line in contrast to screen 310 or a fuzzy line blending with screen 310; however, no matter what appearance is given to the circumference, "c" will be defined mathematically in relation to radius "r" for the purpose of spotlight cursor 320. As shown in FIG. 3, spotlight cursor 320 has not caused any secondary content to appear on screen 310. Screen 310 has "Invert" checkbox 340, "Mirror" checkbox 350 and "Print File Information" checkbox 360.

Figure 4:
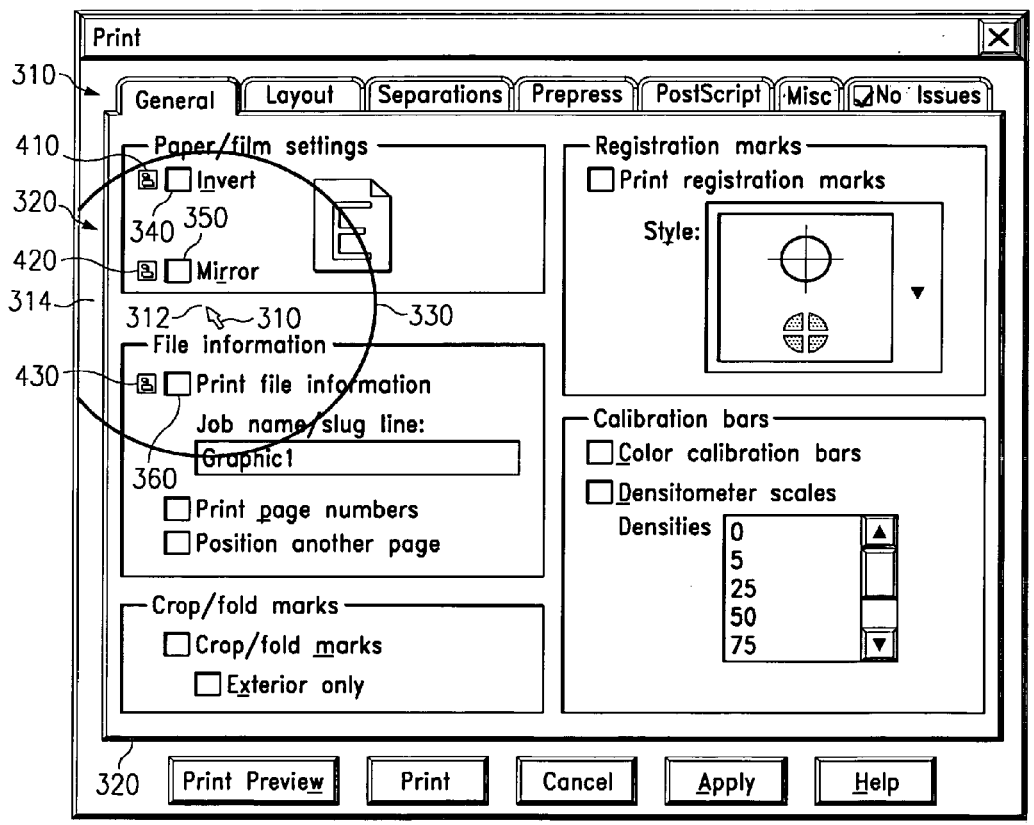
FIG. 4 depicts the spotlight cursor with displayed secondary content.

FIG. 4 depicts screen 310 with spotlight cursor 320 in a new position. The user has moved cursor 310. As cursor 310 moved, light 320, with "c" 330 and center coinciding with tip 312 of cursor 310, also moved. Secondary content information icons have appeared. Specifically "Invert" checkbox information icon 410 has appeared adjacent to "Invert" checkbox 340, "Mirror" checkbox information icon 420 has appeared adjacent to "Mirror" checkbox 320, and "Print file information" checkbox information icon 430 has appeared adjacent to "Print file information" checkbox 360. As will be explained in further detail below the appearance of "Invert" checkbox information icon 410, "Mirror" checkbox information icon 420 and "Print file information" checkbox information icon 430 were caused by covering with "c" of spotlight cursor 320.

As used herein, "cover" means the act of a point on a secondary content being contacted by a point on "c" or being contained within the boundary of "c" or the coordinates of a point on "c" coinciding or equaling coordinates of a point on a secondary control, or a point on the boundary of a predefined zone containing one or more secondary contents. As used herein, secondary content means text, icons, images or controls. The introduction of secondary content in a GUI is done by the application programmer, taking advantage of the capability and availability of the spotlight cursor.

The method for using the spotlight cursor is as follows. The program obtains the x,y coordinates of the cursor. Next, the program applies the pre-selected radius to define a circle of circumference "c" with origin at x,y (tip 312 of FIG. 3) and radius "r". Next the program determines whether or not there are any secondary contents that are within the circumference of the circle. If there is a secondary content within circumference "c" then the secondary content will be activated and revealed in the primary layer of the GUI. If there are no secondary contents within the circumference "c" of the circle, then the program does nothing. The program cycles each time the cursor moves (each time the cursor coordinates change).

The program may be incorporated into an operating system, an application, or the program may be a plug-in for adaptation to a pre-existing program. Once the spotlight feature is active, no further action is needed on the user's part FIG. 5 depicts the flow chart for the process of using spotlight cursor 320. First, the program determines whether or not the cursor has moved. If the cursor has not moved, the program goes to stop 590. Cursor movement activates the program. If the cursor has moved, the program determines whether or not the spotlight cursor is on (530). If the spotlight cursor is not turned on, the program will proceed to stop 590. If the spotlight cursor is turned on the program will proceed to obtain the coordinates of the cursor (540). Next, the program will use the cursor coordinates and "r" to calculate the location of "c", where "c" is the circumference of a circle of radius "r" (550). The value of "r" will be set by a configuration program, a default value or a setting selected by the programmer of the application. Next, the program will determine whether or not "c" has covered secondary content (560). If "c" has covered secondary content, the program will cause the secondary content to be displayed (580). If "c" has not covered a secondary content, the program hide secondary content that has been previously displayed (570) and go to stop 590. If "c" has covered a secondary content, the secondary content will be displayed (580). The secondary content will be displayed according to a method of appearance chosen in a configuration program.

Figure 6:
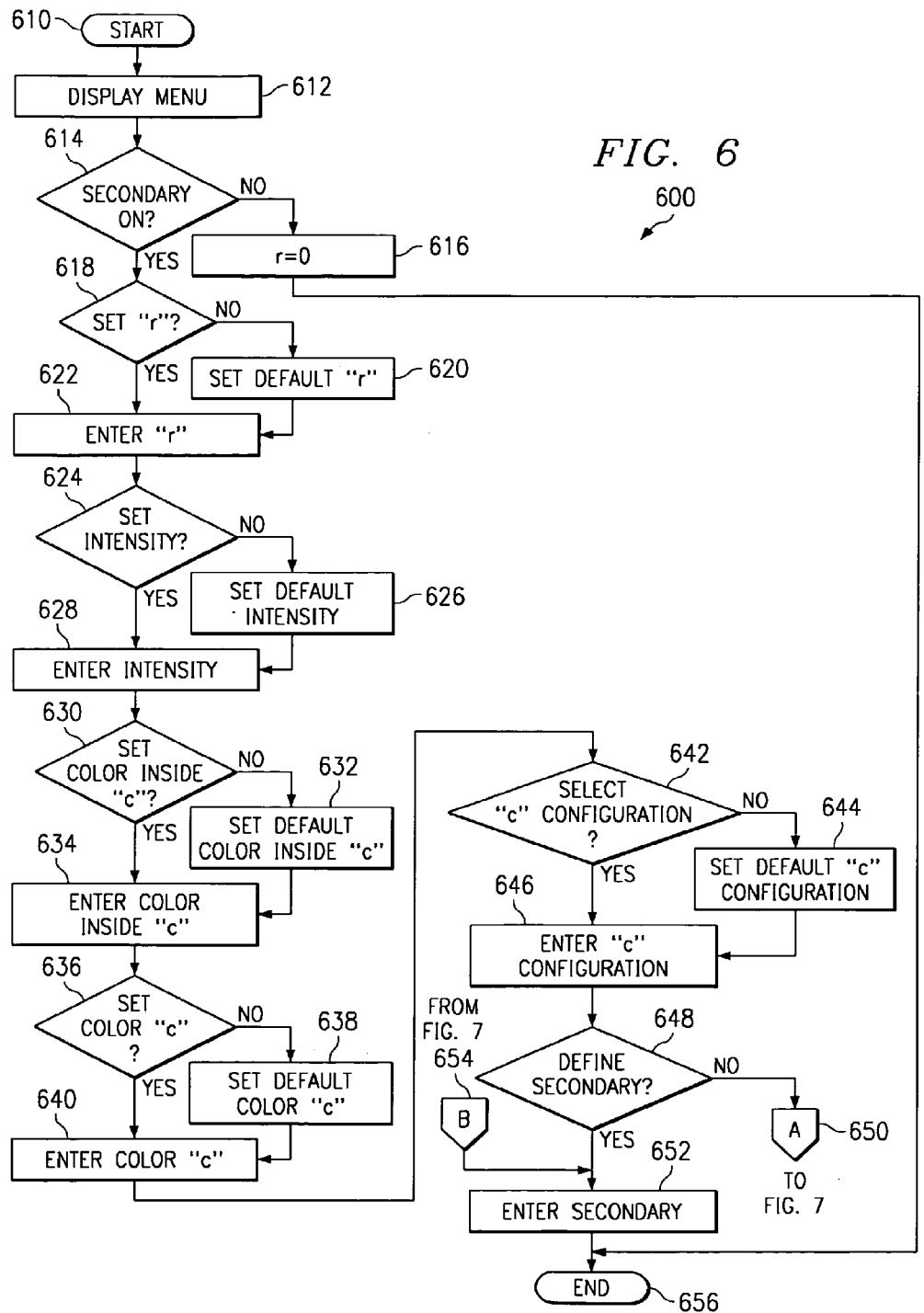
FIG. 6 depicts a flow chart for a second program controlling configuration of the spotlight cursor.

FIG. 6 depicts a flow chart for the program for configuration of the spotlight cursor. The program begins (610) and displays a menu (612). First, the program determines whether or not the secondary content are to be displayed (614). If the user selects "no", the program will set "r"=0 and go to end (656). By setting "r"=0, the spotlight cursor is rendered inoperable as there will be no "c" to cover secondary content. If secondary content are to be displayed, the program will determine whether or not "r" has been selected. If the user has not entered "r", the program will set "r" to a default value. If the user has set "r" the program will determine whether or not the user has set the intensity (624). If "r" is set to a minimum value "1", then spotlight cursor 320 may not be visible at tip 312 of cursor 310. However, spotlight cursor 320 will have a minimum "c" to effect display of secondary content. The intensity is the brightness of the circle of light with circumference "c". If the user has not set the intensity, the program will select the default intensity and the program will set the default value for the intensity (626) and the program will go to step 624 and enter the value for the intensity. If the user sets the intensity, the program will go to step 628 and enter the value for the intensity. Next, the program will determine whether or not a color has been selected for the area inside "c". If the user does not select a color for the area inside "c" the program will set the color to the default color and the program will go to step 634 and enter the color. If the user selects a color for the area inside "c", the program will go to step 634 and enter the color. Next, the program will determine whether a color has been selected for "c". If a color has not been selected for "c", the program will select the default color for "c" and the program will go to step 640 and enter the color. If the user selects a color for "c" the program will go to step 640 and enter the color. Next, the program will determine whether the configuration of "c" has been selected (642). If the user has not selected a configuration for "c", the program will set the configuration of "c" to the default configuration and the program will proceed to step 646 and enter the configuration. If the user has selected a configuration for "c", then the program will enter the configuration for "c" (646). Next, the program will determine the mode of appearance of secondary controls. If the user selected a mode of appearance for secondary controls, the program will enter the mode of appearance of secondary controls (652). If the user has not selected a mode of appearance for secondary controls, then the program will go to a routine shown on FIG. 7 via connection 650.

Referring to FIG. 7, the program will determine whether or not "gradual appearance" has been selected (710). If "gradual appearance" has been selected, the program will set the appearance of secondary content for "gradual appearance" and go to step 770 which will set the display to reveal appearance when covered by "c". If the user has not selected "gradual" then the program will determine whether or not the user has selected "all at once" (730). If the user has selected "all at once" then the program will set appearance for "all at once" and the program will go to step 790 which will set the computer to reveal secondary content when covered by "c". Next, the program will determine, whether or not the user has selected "zone" (750). If the user has not selected "zone", then the program will go to step 790 which will cause the computer to reveal secondary content when covered by "c". Then the routine will return to the main program via connector 654. Referring again to FIG. 6, the program will then enter the secondary definition, and end 656.

Figure 8:
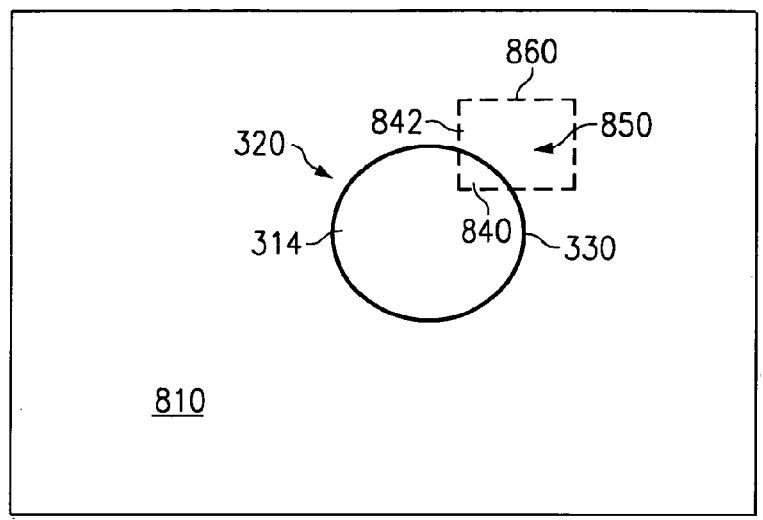
FIG. 8 depicts an example of gradual display.

FIG. 8 depicts circumference "c" gradually revealing a secondary content item. Spotlight cursor 320 has circumference 330 and light 314. Secondary content item 850 has outer edge 860. When circumference 330 covers a point on outer edge 860, secondary content item 850 will start to be displayed. In FIG. 8, circumference 330 has passed over outer edge 860 and intersecting area 840 is revealed while remainder area 342 is not displayed. As circumference 330 advances and cover additional points of secondary item 850 intersecting area 840 will grow and remainder area 342 will decrease.

Figure 9:
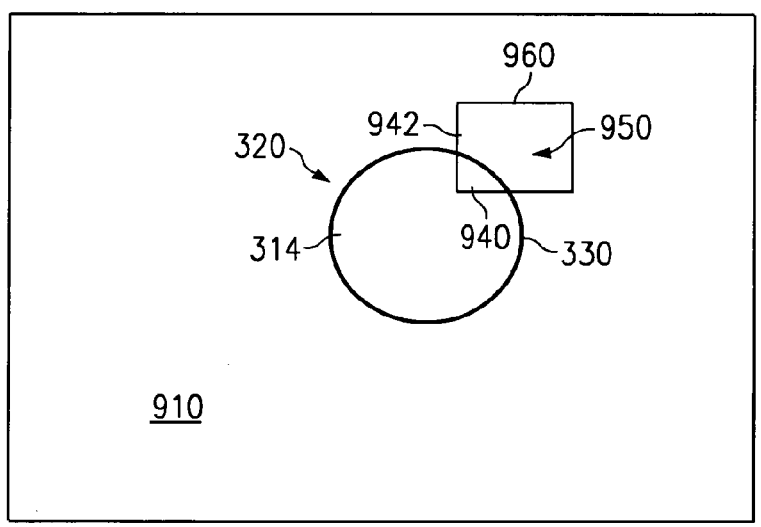
FIG. 9 depicts an example of all display.

FIG. 9 depicts circumference "c" revealing secondary content item 950 all at once. Spotlight cursor 320 has circumference 330 and light 314. Secondary content item 950 has outer edge 960. When circumference 330 covers a point on outer edge 960, secondary content item 950 will be fully displayed. There will be no intersecting area or remainder area. No matter what point on outer edge 960 of secondary content item 950 is covered by circumference 330, all of secondary content item 950 will be displayed.

Figure 10:
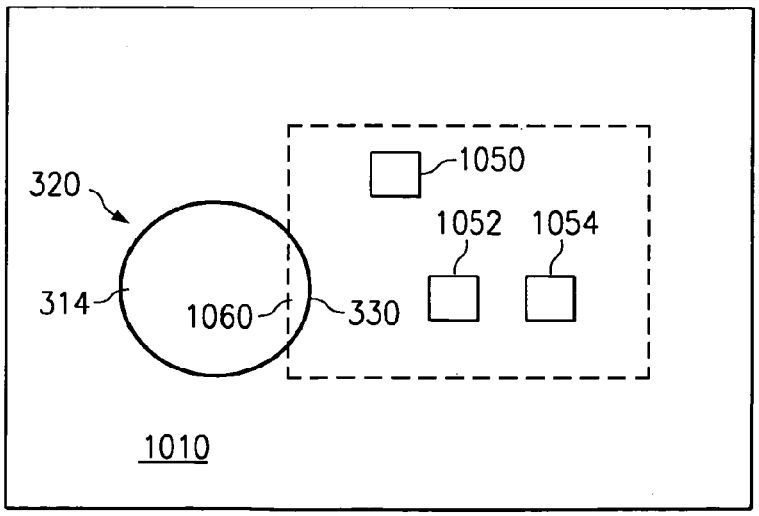
FIG. 10 depicts and example of zone display.

FIG. 10 depicts circumference "c" revealing a group of secondary content by covering a point in the predetermined zone. Spotlight cursor 320 has circumference 330 and light 314. Secondary content items 1050, 1052 and 1054 are positioned within pre-defined zone boundary 1060. When circumference 330 covers a point on zone boundary 1060, all three secondary content items 1050, 1052 and 1054 will appear fully displayed at the same time.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. An apparatus for using a circle of light to cause a text, an image, an icon or a control to appear on a computer screen, the apparatus comprising:
   a computer having a processor and a memory, the computer connected to a display having a screen;
   a program stored in the memory, the program containing a plurality of instructions adapted to cause the processor to perform steps comprising:
   creating the text, the image, the icon, or the control in the screen so that, when a user chooses to hide the text, the image, the icon, or the control, the text, the image, the icon, or the control will only appear in the screen when a first set of coordinates in the circle of light coincides with a second set of coordinates in the text, the image, the icon, or the control;
   using a cursor operable in the screen, the cursor having a tip, establishing the circle of light to have a center at the tip, a configurable radius, a configurable color, and a configurable intensity so that the circle of light will move with the cursor and the center will always be at the tip; and
   moving the cursor on the screen until the circle of light causes the text, the image, the icon, or the control to appear.

2. The apparatus of claim 1, wherein the plurality of instructions are further adapted to cause the processor to perform steps comprising:
   when the user chooses not to hide the text, the image, the icon, or the control, automatically setting the configurable radius to zero.

3. A computer program product for using a circle of light to cause a text, an image, an icon or a control to appear on a computer screen comprising:
   a computer readable storage medium containing a plurality of instructions, the plurality of instructions adapted to cause a processor of a computer connected to a display having a screen to perform steps comprising:
   creating the text, the image, the icon, or the control in the screen so that, when a user chooses to hide the text, the image, the icon, or the control, the text, the image, the icon, or the control will only appear in the screen when a first set of coordinates in the circle of light coincides with a second set of coordinates in the text, the image, the icon, or the control;
   using a cursor operable in the computer screen, the cursor having a tip, establishing the circle of light to have a center at the tip, a configurable radius, a configurable color, and a configurable intensity so that the circle of light will move with the cursor and the center will always be at the tip; and
   moving the cursor on the screen until the circle of light causes the text, the image, the icon, or the control to appear.

4. The computer program product of claim 3, wherein the plurality of instructions is further adapted to cause the processor to perform steps comprising:
   when the user chooses not to hide the text, the image, the icon, or the control, automatically setting the configurable radius to zero.

* * * * *